United States Patent
Gilson et al.

(10) Patent No.: US 10,867,615 B2
(45) Date of Patent: Dec. 15, 2020

(54) VOICE RECOGNITION WITH TIMING INFORMATION FOR NOISE CANCELLATION

(71) Applicant: Comcast Cable Communications, LLC, Philadelphia, PA (US)

(72) Inventors: Ross Gilson, Philadelphia, PA (US); Michael Sallas, Radnor, PA (US); Scott David Kurtz, Mount Laurel, NJ (US); Gary Skrabutenas, Palo Alto, CA (US); Christopher Stone, Newtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 139 days.

(21) Appl. No.: 16/257,702

(22) Filed: Jan. 25, 2019

(65) Prior Publication Data

US 2020/0243103 A1 Jul. 30, 2020

(51) Int. Cl.
*G10L 21/0216* (2013.01)
*G10L 21/055* (2013.01)
*G10L 15/22* (2006.01)
*G10L 15/20* (2006.01)
*G10L 21/0208* (2013.01)

(52) U.S. Cl.
CPC .......... *G10L 21/0216* (2013.01); *G10L 15/20* (2013.01); *G10L 15/22* (2013.01); *G10L 21/055* (2013.01); *G10L 2015/223* (2013.01); *G10L 2021/02082* (2013.01)

(58) Field of Classification Search
CPC ......... G10L 15/20; G10L 15/22; G10L 21/02; G10L 21/0208; G10L 21/02082; G10L 21/0216; G10L 2021/02161; G10L 21/0255
See application file for complete search history.

(56) References Cited

U.S. PATENT DOCUMENTS

| | | | |
|---|---|---|---|
| 5,950,154 A * | 9/1999 | Medaugh | G10L 21/02 704/226 |
| 6,177,928 B1 * | 1/2001 | Basso | H04N 21/234318 375/E7.01 |
| 6,725,193 B1 * | 4/2004 | Makovicka | G10L 21/02 704/233 |

(Continued)

*Primary Examiner* — Eric Yen
(74) *Attorney, Agent, or Firm* — BakerHostetler

(57) ABSTRACT

Systems, devices, and methods are described for reducing degradation of a voice recognition input. An always listening device may always be listening for voice commands via a microphone and may experience interference from unwanted audio such as from the output audio of television speakers. The always listening device may receive data associated with the output audio over a first communications channel. The always listening device may also receive, on a second communications channel, timing information associated with data. The always listening device may adjust admission of the audio received by the microphone to enable it to arrive at approximately the same time as the data received via the first communications channel. The unwanted output audio included in the audio received via the microphone may then be determined and may be removed so that a voice command in the audio received by the microphone may be processed.

20 Claims, 14 Drawing Sheets

(56) References Cited

U.S. PATENT DOCUMENTS

| | | | |
|---|---|---|---|
| 7,668,968 B1* | 2/2010 | Smith | G10L 19/24 |
| | | | 709/234 |
| 9,111,542 B1* | 8/2015 | Hart | G10L 15/30 |
| 9,691,378 B1* | 6/2017 | Meyers | G10L 15/04 |
| 10,657,981 B1* | 5/2020 | Mansour | H04R 1/2873 |
| 2009/0168673 A1* | 7/2009 | Kalampoukas | H04L 65/80 |
| | | | 370/286 |
| 2014/0095177 A1* | 4/2014 | Kim | G10L 21/06 |
| | | | 704/275 |
| 2014/0254816 A1* | 9/2014 | Kim | H04M 9/082 |
| | | | 381/71.11 |
| 2015/0228282 A1* | 8/2015 | Evrard | H04R 1/08 |
| | | | 704/275 |
| 2015/0332704 A1* | 11/2015 | Sun | H04B 3/23 |
| | | | 704/227 |
| 2017/0040026 A1* | 2/2017 | Kuo | G10L 21/0208 |
| 2020/0051581 A1* | 2/2020 | Luis Valero | G10L 21/0232 |
| 2020/0091959 A1* | 3/2020 | Curtis | G06F 3/165 |

\* cited by examiner

VOICE RECOGNITION WITH TIMING INFORMATION FOR NOISE CANCELLATION

BACKGROUND

Voice recognition systems and user devices configured to receive and respond to voice queries are becoming increasingly common. A voice query may be, for example, a spoken command to the user device to perform some action, a spoken request to view or play some particular content, a spoken request to search for certain content or information based on search criteria, or any other spoken request or command that may be spoken by a user. By removing the need to use buttons and other modes of selection, such devices may be controlled by a user in a hands-free manner, for example, by the user speaking a wake-up phrase, and allow the user to issue voice queries while performing other tasks.

When a device attempts to capture audio for the purpose of speech recognition (or verbal communication), the accuracy of the speech recognition can be degraded by audio emanating from a television or other audio source that is located in close proximity to the device.

SUMMARY

Systems, devices, and methods are described for reducing degradation of a voice recognition input. An always listening device may always be listening for voice commands via a microphone and may experience interference from unwanted audio such as from the output audio of the speakers of a television. The always listening device may receive data associated with the output audio over a first communications channel. The always listening device may also receive, on a second communications channel, timing information associated with the received data. The always listening device may adjust admission of the audio received by the microphone to enable it to arrive at approximately the same time as the data received via the first communications channel. Because the audio received by the microphone has been adjusted to arrive at the same time as the data received via the first communications channel, the unwanted output audio included in the audio received via the microphone may be identified and may be removed. Accordingly, the voice command in the audio received by the microphone may be processed without being degraded by the unwanted output audio.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Figure 1:
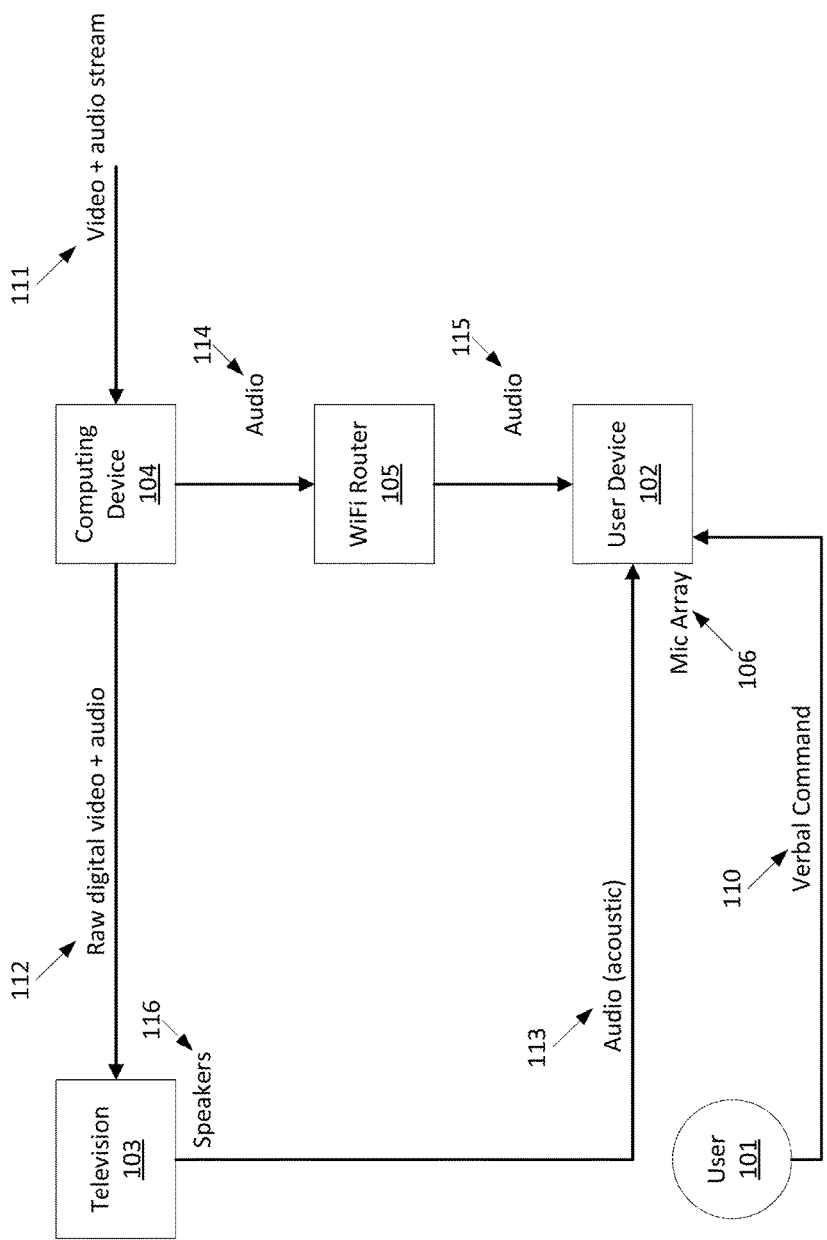
FIG. 1 shows an example system.

When a user device in communication with a voice recognition engine receives a voice query or command from a user, the user device may be configured to stream audio data of the voice query or command to the voice recognition engine where it may be processed to determine the meaning of what the user uttered. The voice recognition engine may also stream the audio data to a server capable of performing automated speech recognition and to receive, from the server, a transcription of the voice query or command.

For example, a user may speak a voice command, such as "tune to channel 4," to a user device such as a remote control configured for controlling a cable set-top box. A microphone in the remote control may capture the voice command and stream audio data based on the voice command to the set-top box. The set-top box may forward the audio data to a voice recognition engine configured to determine the voice command and respond accordingly.

The automated speech recognition engine may send a transcription of the audio, in this example the text, "tune to channel 4," back to the voice recognition engine. The voice recognition engine may employ natural language processing techniques to understand the meaning of the text "tune to channel 4." In this example, the voice recognition engine may recognize that the user wishes to tune to the channel carrying the television programming for "channel 4." The voice recognition engine may then cause a command to be sent to the set-top box of the user to cause the set-top box to tune to the channel carrying the programming for "channel 4."

In examples such as those described above, directional microphones or acoustic beamforming may be used to perform spatial filtering in order to isolate television speakers, talkers, or other individual interference sources in a room. However, such techniques may not be as effective when the desired source and the undesired interference source emanate from the same general direction with respect to the microphone. Furthermore, even when the interfering source does not emanate from the same general direction, reflections of the interfering signal may still emanate from the same general direction as the desired source, causing undesired interference. Additionally, even when the interfering signal is not in the same general direction as the desired source, the degree to which spatial filtering is effective may be limited by the number of microphones in the array, tolerances between microphones and other circuitry, and inherent algorithmic limitations.

One technique for reducing degradation due to an interfering signal is to model the acoustics of the room and excite the model with the television audio signal, thereby forming an estimate of the interfering signal. This estimate may then be subtracted from the microphone input signal, leaving the desired signal without the unwanted interfering signal. This can be accomplished using adaptive filtering methods that are typically employed by acoustic echo cancellers (AECs). A typical use of an AEC is in a speakerphone or other hands-free device where the speaker output needs to be removed from the microphone input. Is should be understood that the described embodiments may include other scenarios where unwanted signals are to be removed from a desired audio signal.

In order for an AEC to operate properly, the following conditions should be met:

(1) The acoustic echo canceller (AEC) has access to both the receive output signal (the signal travelling toward the speaker) and the transmit input signal (the signal that reaches the microphone). The transmit input signal includes the speaker's speech plus noise and interference that occurs in the room.

(2) The relative timing between the receive output and transmit input signal is known within a small tolerance.

A user device such as a remote control for a cable set-top box may have access to a transmit input (microphone) signal directly from a microphone array when it is located in the user device. The receive output (the signal travelling toward the speaker) may travel from the set-top box to a television. The television may perform the digital to analog conversion and may feed the converted signal to speakers or other audio output devices associated with the television. A copy of the receive audio stream may be sent from the set-top box to the user device via a WiFi (or other) connection. This enables the first condition above to be satisfied. However, WiFi networks can exhibit considerable packet jitter, making it difficult to resolve the relative timing between the receive and transmit signals. Further, the WiFi connection may not be as fast as the High-Definition Multimedia Interface (HDMI) connection used to send the receive output from the set-top box to the television. The WiFi connection quality and speed also vary greatly over time.

Methods, devices, and systems are described herein that resolve the relative timing between the receive and transmit signals. In some implementations, an Internet Protocol (IP) stream of audio packets may be synchronized with audio received at a microphone and interfering audio may be filtered from voice commands. A system may comprise a computing device (e.g., a content streaming device, laptop, smartphone, a set-top box, or a smart television), and a user device with a microphone input, such as an always on listening assistant device (e.g., a remote control with a microphone that is capable of processing voice commands or a smart device with a microphone and a speaker that is capable of processing voice commands and playing back content or providing other services or features). The always listening device may always be listening for voice commands via the microphone and may experience interference from unwanted audio such as the audio from an output device such as the speakers of a television.

The techniques described herein enable the system to filter out this unwanted audio. The computing device, while sending audio data to an output device, may also send that audio data to the always listening device over a WiFi connection to enable the always listening device to determine which audio data is unwanted and should be filtered out. As noted above, the WiFi connection may not be as fast as the connection to the output device (e.g., a HDMI connection), and the WiFi connection quality and speed also vary greatly over time. In the systems and methods described herein, a medium whose end-to-end transmission timing characteristics are more deterministic may be used to provide an audio timing reference.

In the systems and methods described herein, two connections may be maintained between the computing device and the device to provide the audio timing reference: (1) the WiFi connection for the transfer of the audio data, which may be slower and may fluctuate; and (2) a Radio Frequency for Consumer Electronics (RF4CE) connection, which is faster and may act as a reference constant. The always listening device may compare timing information, such as for example by comparing timestamps in the audio data transmitted via the WiFi connection with timestamps in the RF4CE connection to determine a current speed of the WiFi connection (the speed at which the device receives data from the computing device). The always listening device may then adjust (e.g., delay) admission of audio data received via the microphone input to enable it to arrive at approximately the same time as the audio data from the computing device via the WiFi connection. Because the microphone audio has been adjusted (e.g., delayed) to arrive at the same time as the audio data from the computing device via the WiFi connection, the unwanted audio data/interference received at the microphone input may then be determined by matching it with the synchronized audio data, and it then may be removed. Accordingly, the voice command in the microphone audio is not degraded by unwanted audio received at the microphone.

The RF4CE connection may comprise parameter modifications. Parameter modifications including but not limited to the following may reduce latency and increase the predictability of the control/timing stream over RF4CE:

Each packet in the RF4CE connection may include an identifier of the audio stream sent via the streaming network (a timestamp, sequence number, packet number, etc.);

Each transmission may disable clear channel assessment (CCA), which may prevent the RF4CE radio from transmitting if other energy is detected;

Request to Send/Clear to Send (RTS/CTS) may be disabled, but slots may be cleared during session setup by sending special RTS frames to request bandwidth and enable the access point (AP to keep slots clear;

Each frame in the RF4CE connection may disable retransmissions and may not be acknowledged;

Each frame in the RF4CE connection may be sent with a frequency such that if some frames are lost the clock source can be maintained; and Channel hopping may also be disabled.

For audio sent over a Multimedia over Coax Alliance (MoCA) connection, parameterize quality of service (pQoS) may be used for guaranteed transmission slots and maximum latency. In systems that comprise Multi-user MIMO (MU-MIMO) technology, a specific group may be configured for transmission over any time.

FIG. 1 shows an example system 100. The system 100 may comprise a computing device 104. The computing device 104 may comprise a set-top box, a wireless gateway, a desktop computer, a laptop computer, a handheld computer, a tablet, a netbook, a smartphone, a gaming console, or any other computing device capable of operating in a wireless or wired network. The computing device 104 may comprise transmitters, receivers, and/or transceivers for communicating a wireless or wired network. The computing device 104 may receive a video and audio stream 111. The video and audio stream 111 may comprise an MPEG stream comprising video and audio from a cable network via a coax cable or from an IP-based connection.

The system may comprise a user device 102 with a microphone array 106. The user device 102 may comprise an always-on listening assistant device, a remote control with a microphone, a speakerphone, a smartphone, a tablet, a laptop computer, a handheld computer, a desktop computer, or any other computing device capable of operating in a wireless or wired network and capable of processing voice commands. The user device 102 may comprise transmitters, receivers, and/or transceivers for communicating a wireless or wired network.

The computing device 104 and the user device 102 may communicate via the WiFi router 105. The WiFi router 105 may operate as a wireless local area network (WLAN) router. In some examples, the WiFi router 105 may operate as a cable modem. The WiFi router 105 may comprise transmitters, receivers, and/or transceivers for communicating via a wireless or wired network.

The computing device 104 may stream raw video and audio 112 to a television 103. The raw video and audio 112 may comprise raw digital video and audio streamed via an HDMI connection. The television 103 may output the audio data 112 via its speakers 116. The speakers 116 may output the audio, and the acoustic audio 113 may be received by the microphone array 106. The acoustic audio 113 may interfere with a verbal command 110 received by the microphone array 106 from a user 101.

The user device 102 may comprise an IP manager configured to receive a copy of the audio data 112 that is streamed to the television 103 from the computing device 104. The computing device 104 may send a copy of the audio data 114 to the WiFi router 105, which may send the audio data 115 to the user device 102. The audio data 114 and audio data 115 may each be sent via User Datagram Protocol (UDP). Alternatively, the computing device 104 may send the copy of the audio data directly to the user device 102. The user device 102 may buffer the audio data 115, and feed the audio data 115 to an AEC in order to cancel the acoustic audio 113 that is outputted by the speakers 116 of the television 103. The quality of the user's voice commands may also be improved prior to processing the commands by a keyword detector and a speech recognizer of the user device 102. The cancellation of the acoustic audio 113 that outputted by the speakers 116 of the television 103 may be enabled by accounting for issues such as delay, delay jitter, sampling clock mismatch, and stereo AEC.

Figure 2:
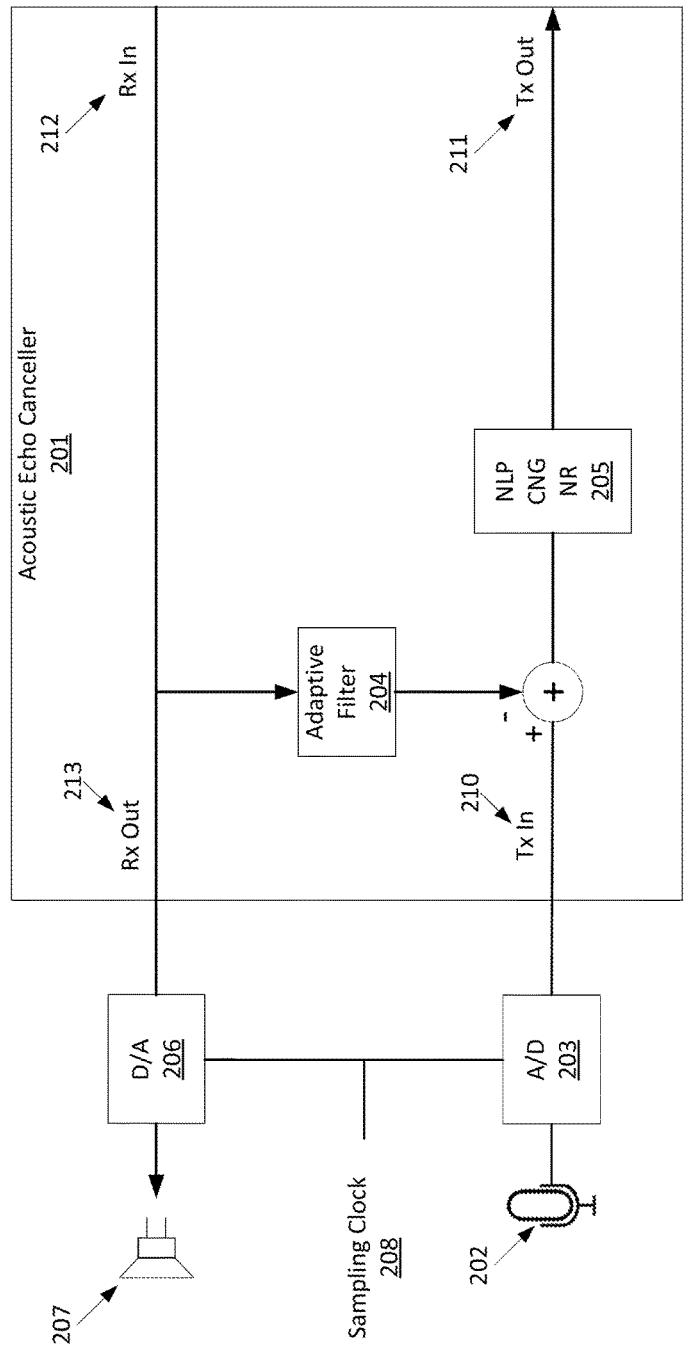
FIG. 2 shows an example system.

FIG. 2 shows an example system 200. The system 200 may comprise an AEC 201. The AEC 201 may be used in the user device 102 of FIG. 1 such as an always-on listening assistant device, a remote control with a microphone, a speakerphone, a smartphone, a tablet, a laptop computer, a handheld computer, or a desktop computer. The AEC 201 may be in proximity to both a speaker 207 and a microphone 202. The receive signal, Rx In 212, may pass through the AEC 201 on its way to the digital-to-analog (D/A) converter 206 and the speaker 207. This may allow the AEC 201 access to a reference signal that is identical to the signal that reaches the speaker 207, which may then be sent to an adaptive filter 204 so that the reference signal may be removed from the microphone input signal, Tx In 210. The filtered signal may then be sent for non-linear processing (NLP), comfort noise generation (CNG), and noise reduction (NR) 205 before being outputted by the AEC 201, Tx Out 211.

In some devices such as a speakerphone, the amount of delay between the microphone 202 and the transmit direction, Tx In 210, of the AEC 201 and the delay between the receive output, Rx Out 213, of the AEC 201 and the speaker 207 may also be small. These delays may be known with reasonable accuracy may be consistent. The sampling clock 208 that controls the speaker output D/A converter may be the same as the sampling clock that controls the microphone input analog-to-digital (A/D) converter 203. However, as noted above, these conditions are not always able to be met such as an always-on listening assistant device or a remote control with a microphone.

Figure 3:
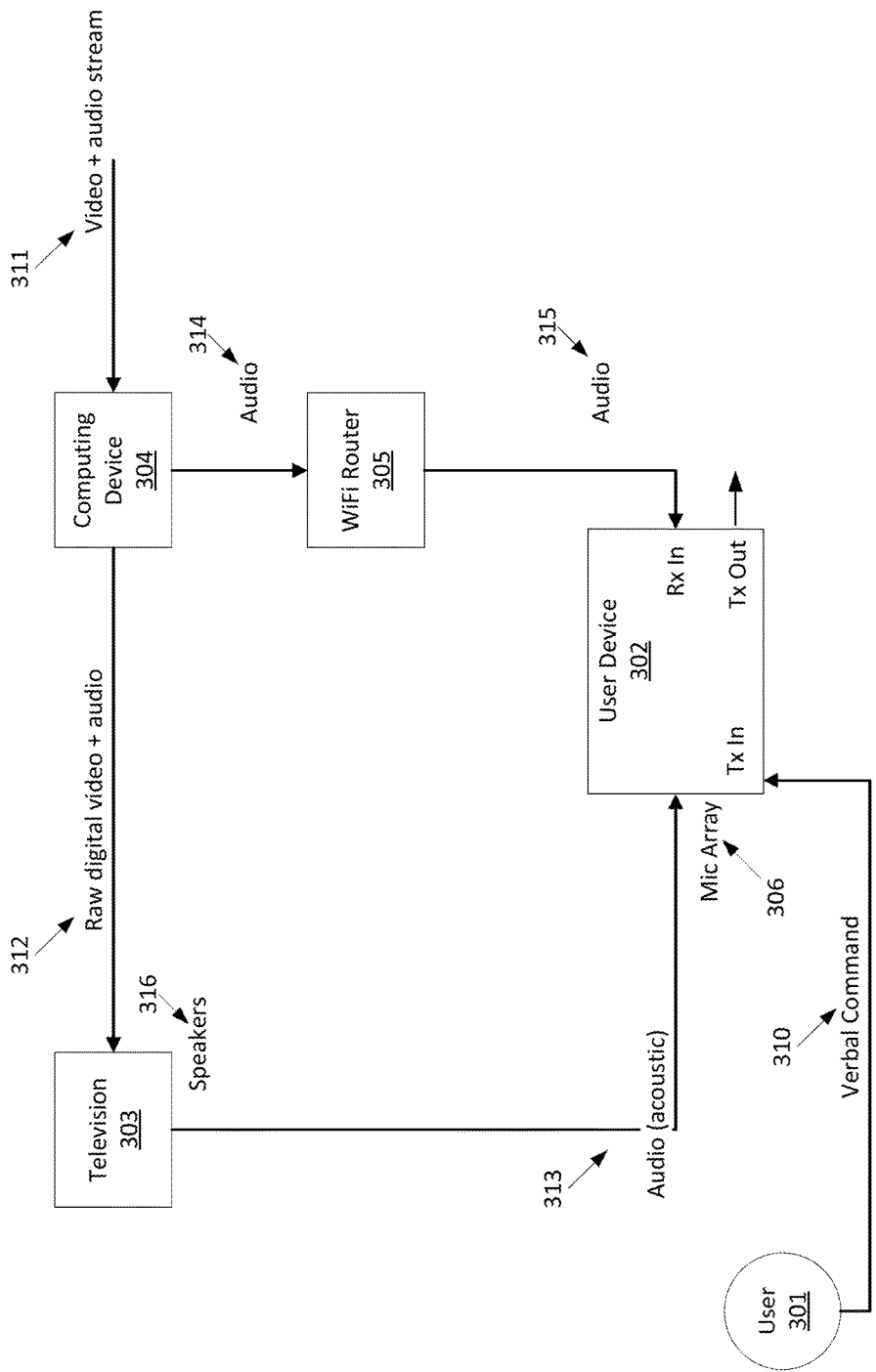
FIG. 3 shows an example system.

FIG. 3 shows an example system 300. The system 300 may comprise a computing device 304. The computing device 304 may comprise a set-top box, a wireless gateway, a desktop computer, a laptop computer, a handheld computer, a tablet, a netbook, a smartphone, a gaming console, or any other computing device capable of operating in a wireless or wired network. The computing device 304 may comprise transmitters, receivers, and/or transceivers for communicating a wireless or wired network. The computing device 304 may receive a video and audio stream 311. The video and audio stream 311 may comprise an MPEG stream comprising video and audio from a cable network via a coax cable or from an IP-based connection.

The system may comprise a user device 302 with a microphone array 306. The user device 302 may comprise an always-on listening assistant device or a remote control with a microphone capable of processing voice commands. The user device 302 may comprise transmitters, receivers, and/or transceivers for communicating a wireless or wired network. The user device 302 may comprise an AEC such as the AEC 201 of FIG. 2.

The computing device 304 and the user device 302 may communicate via the WiFi router 305. The WiFi router 305 may operate as WLAN router. In some examples, the WiFi router 305 may operate as a cable modem. The WiFi router 305 may comprise transmitters, receivers, and/or transceivers for communicating via a wireless or wired network.

The computing device 304 may stream raw video and audio 312 to a television 303. The raw video and audio 312 may comprise raw digital video and audio streamed via an HDMI connection. The television 303 may output the audio data 312 via its speakers 316. The speakers 316 may output the audio, and the acoustic audio 313 may be received by the microphone array 306. The acoustic audio 313 may interfere with a verbal command 310 received by the microphone array 306 from a user 301.

The user device 302 may comprise an IP manager configured to receive a copy of the audio data 312 that is streamed to the television 303 from the computing device 304. The computing device 304 may send a copy of the audio data 314 to the WiFi router 305, which may send the audio data 315 to the user device 302. Alternatively, the computing device 304 may send the copy of the audio data directly to the user device 302. The audio data 314 and audio data 315 may each be sent via UDP.

Because the audio signal takes two paths: audio 312 from the computing device 304 to the television 303 (e.g., via an HDMI connection) and another from the computing device 304 to the AEC Rx In of the user device 302 via WiFi (e.g., via UDP), the potential delay may be long, unknown, inconsistent, or a combination. Additionally, it may be possible that the AEC's reference (Rx IN) signal, audio data 315, may be different from the television audio signal (audio 312). In one example, the audio may be different based on volume changes performed at the television 303. Furthermore, the D/A converter sampling clock of the television 303 may not be locked to that of the user device 302 control microphone A/D converter.

Figure 4:
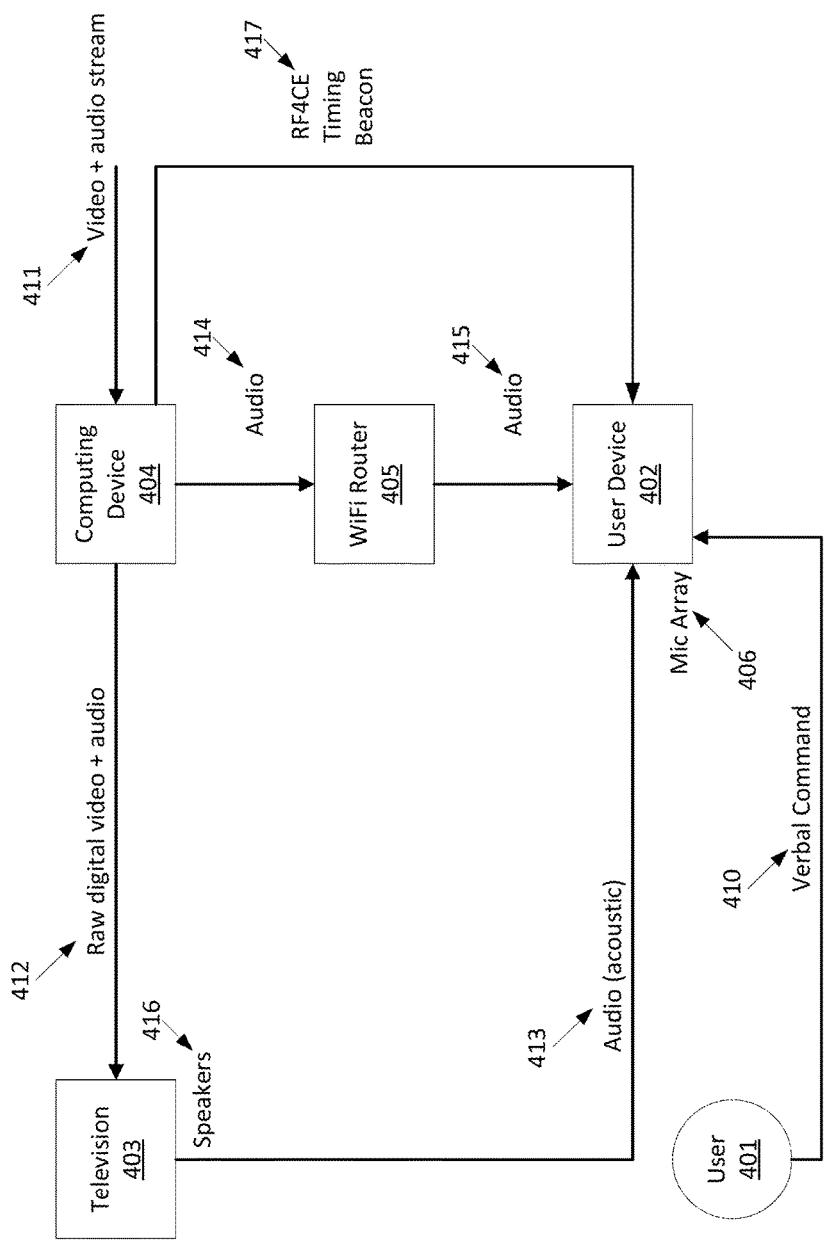
FIG. 4 shows an example system.

FIG. 4 shows an example system 400. The system 400 may comprise a computing device 404. The computing device 404 may comprise a set-top box, a wireless gateway, a desktop computer, a laptop computer, a handheld computer, a tablet, a netbook, a smartphone, a gaming console, or any other computing device capable of operating in a wireless or wired network. The computing device 404 may comprise transmitters, receivers, and/or transceivers for communicating a wireless or wired network. The computing device 404 may receive a video and audio stream 411. The video and audio stream 411 may comprise an MPEG stream comprising video and audio from a cable network via a coax cable or from an IP-based connection.

The system may comprise a user device 402 with a microphone array 406. The user device 402 may comprise an always-on listening assistant device or a remote control with a microphone capable of processing voice commands. The user device 402 may comprise transmitters, receivers, and/or transceivers for communicating a wireless or wired network. The user device 402 may comprise an AEC such as the AEC 201 of FIG. 2.

The computing device 404 and the user device 402 may communicate via the WiFi router 405. The WiFi router 405 may operate as a WLAN router. In some examples, the WiFi router 405 may operate as a cable modem. The WiFi router 405 may comprise transmitters, receivers, and/or transceivers for communicating via a wireless or wired network.

The computing device 404 may stream raw video and audio 412 to a television 403. The raw video and audio 412 may comprise raw digital video and audio streamed via an HDMI connection. The television 403 may output the audio data 412 via its speakers 416. The speakers 416 may output the audio, and the acoustic audio 413 may be received by the microphone array 406. The acoustic audio 413 may interfere with a verbal command 410 received by the microphone array 406 from a user 401.

The user device 402 may comprise an IP manager configured to receive a copy of the audio data 412 that is streamed to the television 403 from the computing device 404. The computing device 404 may send a copy of the audio data 414 to the WiFi router 405, which may send the audio data 415 to the user device 402. Alternatively, the computing device 404 may send the copy of the audio data directly to the user device 402. The audio data 414 and audio data 415 may each be sent via UDP.

RF4CE timing beacons 417 may be sent from the computing device 404 to the user device 402. The RF4CE timing beacons 417 may be used in an audio delay estimation function and a sampling clock synchronization function of the user device 402. Because the timing of RF4CE is typically more deterministic than that of WiFi, the RF4CE timing beacon 417 may be used to estimate the unknown audio data delay, e.g., audio-over-UDP packet delay. The sampling clock synchronization function may be configured to make small changes to the received audio sampling rate in order to attempt to make the receive audio and microphone array 406 input audio operate at the same effective sampling rate.

Figure 5:
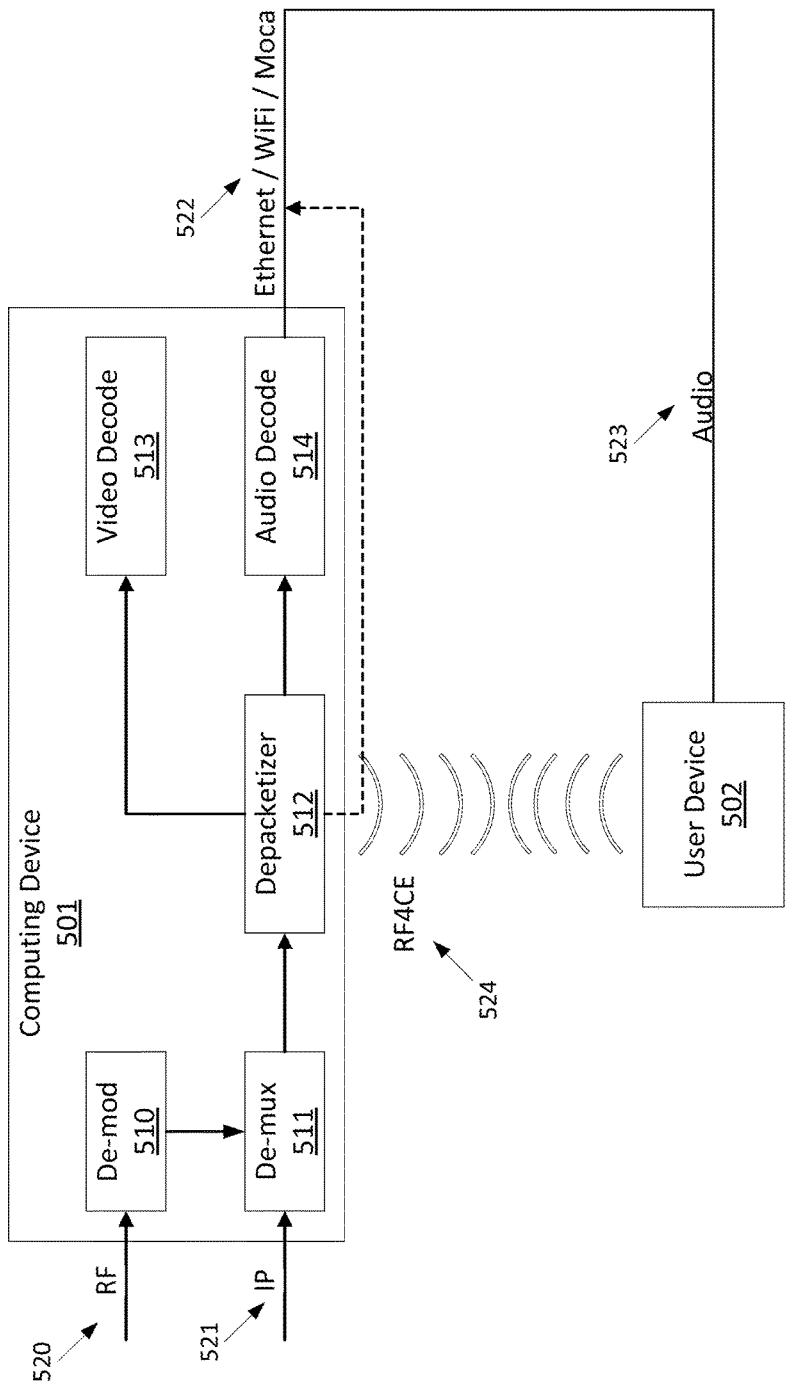
FIG. 5 shows an example system.

FIG. 5 shows an example system 500. The system 500 may comprise a computing device 501. The computing device 501 may comprise a set-top box, a wireless gateway, a desktop computer, a laptop computer, a handheld computer, a tablet, a netbook, a smartphone, a gaming console, or any other computing device capable of operating in a wireless or wired network. The computing device 501 may comprise transmitters, receivers, and/or transceivers for communicating a wireless or wired network. The system may comprise a user device 502. The user device 502 may comprise an always-on listening assistant device or a remote control with a microphone capable of processing voice commands. The user device 502 may comprise transmitters, receivers, and/or transceivers for communicating a wireless or wired network. The user device 502 may comprise an AEC such as the AEC 201 of FIG. 2.

The computing device 501 may receive audiovisual content. The computing device 501 may receive the audiovisual content via an RF or optical medium 520 or from an IP-based connection 521. The audiovisual content received from a cable network via the RF or optical medium 520, which may comprise a coax cable. The audiovisual content may comprise an MPEG stream comprising video and audio. The content may also be delivered via other physical mediums which include but are not limited to: hybrid fiber coaxial network, MoCA, WiFi, a passive optical network (PON), or from another content presentation device via HDMI. In examples in which the content is delivered by an RF or optical medium, the audiovisual content may be demodulated by a demodulator 510. The content may then be demultiplexed by a demultiplexer 511 and further processed by a de-packetizing engine 512 that separates the primary audio and video stream from the primary transport. The audio and video may then be decoded by the audio decoder 514 and video decoder 513, respectively, and processed for presentation on the various outputs of the computing device 501.

For example, Dolby AC-3 audio content that is intended for presentation out of an HDMI port in a pulse-code modulation (PCM) format may be decoded to PCM and output over HDMI. Likewise, video content may be decoded, color space converted to YCC, and likewise sent out over HDMI. In another example, the audio and video may be decoded, converted to baseband, and remodulated on an RF carrier and output over an RF output. In yet another example, audiovisual content received by the computing device 501 via an HDMI input may need to be processed to convert the audio and/or video into a format that can be processed and output by the computing device 501. For example, PCM audio received over HDMI may be encoded as Dolby AC-3 and then sent out. To reduce latency, in some examples, the audio packets may be retrieved when output from the de-packetizing engine 512 and prior to decoding and sent out to the user device 502. In the case of HDMI input with PCM audio, the audio may be sent to the user device 502 after it is encoded.

The system 500 may be configured for noise cancellation. The noise cancellation may filter unwanted audio received by the user device 502 when its microphone is processing a voice command. An initial step in noise cancellation may comprise acquiring samples of an audio source (e.g., unwanted audio) that are to be canceled, which may be enabled by the computing device 501 sending a stream of audio data 523 over a LAN interface 522 (e.g., MoCA, WiFi, or Ethernet) to the user device 502. The stream of audio data 523 comprise a copy of the audio output by the computing device 501.

The audio data 523 may be sent to the user device 502 via UDP to a UDP socket of the user device 502. RF4CE or Bluetooth may also be used if a low bitrate is acceptable, but RF4CE or Bluetooth are typically not used due to the stream 522 including an unaltered audio stream without compression. The jitter experienced over the LAN interface 522 (e.g., MoCA, WiFi, or Ethernet) may be high enough to cause issues when aligning the source audio with the audio collected via the microphone on the user device 502. As this data may also travel over communications channels between physical networks (such as MoCA/Ethernet to WiFi), the jitter may be further exacerbated, particularly when one of the physical transports is WiFi.

Timing information may be sent from the computing device 501 to the user device 502 via the RF4CE connection 524. The timing information may comprise timestamps in the RF4CE packets (e.g. beacons). The user device 502 may compare the timing information, such as for example by comparing timestamps in both the audio data 523 transmitted via LAN interface 522 and the timestamps sent via the RF4CE connection 524 in order to determine a current speed of the LAN interface 522. This speed may indicate, the speed at which the user device 502 is receiving data from the computing device 501 via the LAN interface 522 in comparison to audio received at the microphone input of the user device 502.

The user device 502 may then adjust receipt of audio data received via the microphone input of the user device 502 in order to enable its arrival at approximately the same time as the audio data 523 from the computing device 501 via the LAN interface 522. Because the microphone audio has been adjusted (e.g., delayed) to arrive at the same time as the audio data 523, the unwanted audio data/interference received at the microphone input of the user device 502 may be determined by matching it with the synchronized audio data 523 and then may be removed. Accordingly, the voice command in the microphone audio is not degraded based on unwanted audio received at the microphone input of the user device 502.

Figure 6:
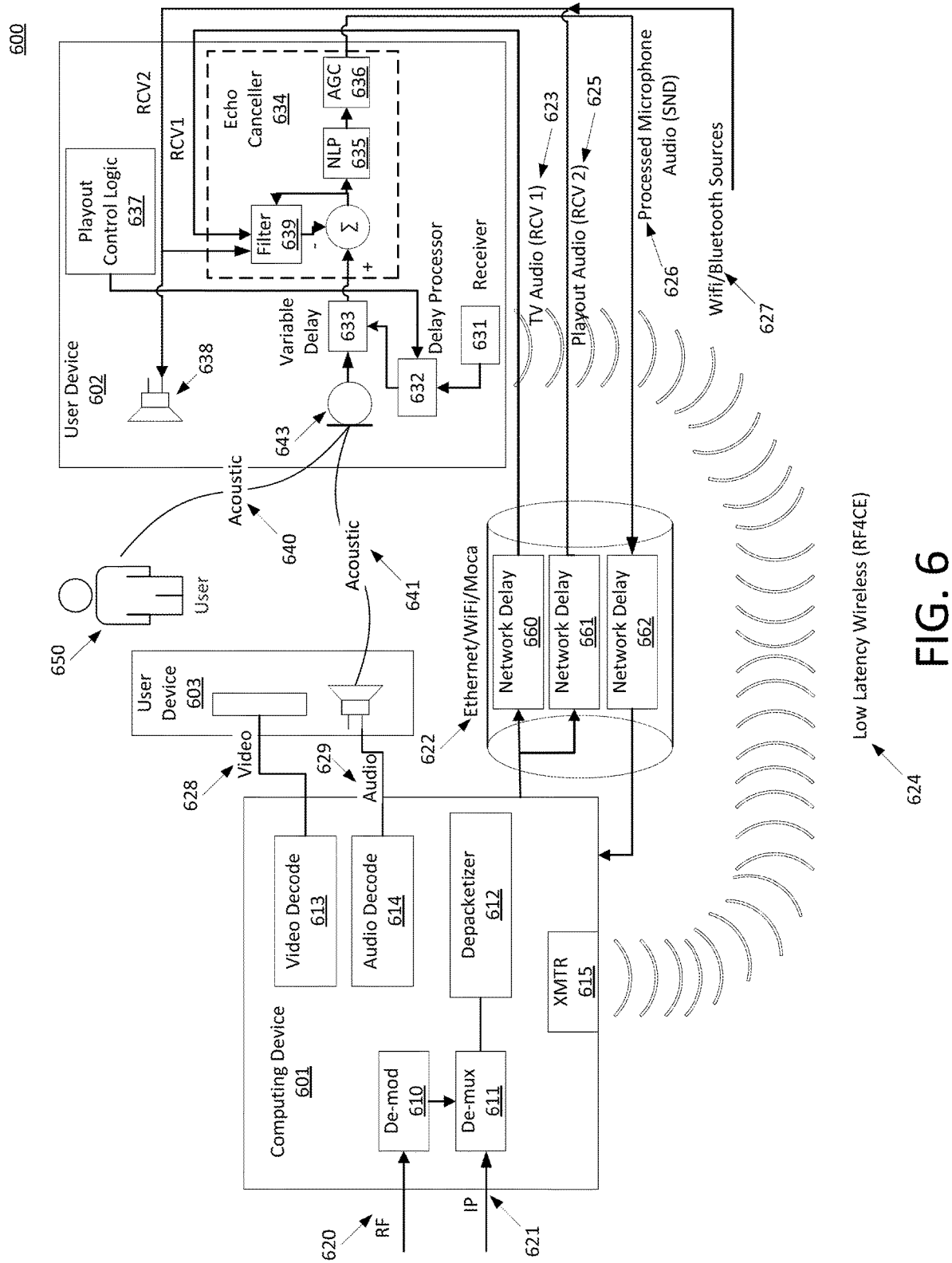
FIG. 6 shows an example system.

FIG. 6 shows an example system 600. The system 600 may comprise a computing device 601. The computing device 601 may comprise a set-top box, a wireless gateway, a desktop computer, a laptop computer, a handheld computer, a tablet, a netbook, a smartphone, a gaming console, or any other computing device capable of operating in a wireless or wired network. The computing device 601 may comprise transmitters, receivers, and/or transceivers for communicating a wireless or wired network. The user device 603 may comprise a television or other content presentation device.

The system may comprise a user device 602. The user device 602 may comprise an always-on listening assistant device or a remote control with a microphone capable of processing voice commands. The user device 602 may comprise transmitters, receivers, and/or transceivers for communicating a wireless or wired network. The user device 602 may comprise an echo canceller 634. A user 650 may generate a voice command that is received acoustically 640 at a microphone 643 of the user device 602.

Audio from sources such as the user device 603, which may comprise a television, may also be received acoustically 641 at the microphone 643 of the user device 602. The audio source of user device 603 may be, for example, on the same side of the microphone 643 of the user device 603. The audio from the user device 603 received acoustically 641 at the microphone 643 of the user device 602 is unwanted audio that may degrade the quality and recognition of the voice command that is received acoustically 640 at the microphone 643 of the user device 602.

A local speaker 638 of the user device 602 may be used for the playout of audio that was requested for playout based on a voice command from the user 650. The audio that was requested for playout based on a voice command from the user 650 may be received by the user device 602 via playout audio (RCV 2) 625 over the LAN interface 622 or via other WiFi or Bluetooth sources 627. The playout audio (RCV 2) 625 stream may comprise a delay based on a network delay 661. The audio from local speaker 638 may also be received acoustically at the microphone 643 of the user device 602 based in part to the proximity of local speaker 638 to microphone 643. The audio from local speaker 638 received acoustically at the microphone 643 of the user device 602 is unwanted audio that may degrade the quality and recognition of the of the voice command that is received acoustically 640 at the microphone 643 of the user device 602.

The computing device 601 may receive audiovisual content. The computing device 601 may receive the audiovisual content from a cable network via an RF or optical medium 620 (e.g., a coax cable) or from an IP-based connection 621. The audiovisual content may comprise an MPEG stream comprising video and audio. The content may also be delivered via other physical mediums which include but are not limited to: hybrid fiber coaxial network, MoCA, WiFi, a PON, or from another content presentation device via HDMI (e.g., user device 603). In examples in which the content is delivered by an RF or optical medium, the audiovisual content may be demodulated by a demodulator 610. The content may then be demultiplexed by a demultiplexer 611 and further processed by a de-packetizing engine 612 that separates the primary audio and video stream from the primary transport. The audio and video may then be decoded by the audio decoder 614 and video decoder 613, respectively, and processed for presentation on the video output 628 and audio output 629 of the computing device 601.

The system 600 may be configured for noise cancellation. Noise cancellation may comprise acquiring samples of an audio source that are to be cancelled (e.g., the unwanted audio from the user device 603 received acoustically 641 at the microphone 643), which may be enabled by the computing device 601 sending a stream of the audio, such as television audio (RCV 1) 623, as a packet stream over a LAN interface 622 (e.g., Ethernet, WiFi, or MoCA) to the user device 602. The television audio (RCV 1) 623 stream may comprise a copy of the audio output 629. The television audio (RCV 1) 623 stream may comprise a delay based on a network delay 660.

Timing information may be sent from the transmitter 615 of the computing device 601 to the receiver 631 of user device 602 via a low latency connection 624 (e.g., RF4CE). The timing information may comprise timestamps in the RF4CE packets (e.g., beacons).

The user device 602 may be configured to compensate for a delay. The user device 602 may compare the timing information received via the low latency connection 624 with the timing of data received via the LAN interface 622. The user device 602 may comprise a delay processor 632 configured to determine the delay. Timestamps in the RF4CE packets received via the low latency connection 624 may be synchronized to correspond to timestamps in packets in the television audio (RCV 1) 623 stream. The delay processor 632 may determine the delay by comparing (1) timestamps in the RF4CE packets received via the low latency connection 624 that are synchronized to the television audio (RCV 1) 623 stream with (2) corresponding timestamps in the television audio (RCV 1) 623 received by the user device 602 via the LAN interface 622. The determined delay may comprise the difference between arrival times of the timing information (e.g., timestamp, beacon, etc.) received via the low latency connection 624 and the arrival times of corresponding packets in the television audio (RCV 1) 623 stream received via the LAN interface 622.

The delay processor 632 may be configured to control a variable delay function 633 in the microphone 643 audio path of the user device 602. The variable delay function 633 may compensate for delay determined by the delay processor 632. The delay determined by the delay processor 632 may indicate, the speed at which the user device 602 is receiving data from the computing device 601 via the LAN interface 622 in comparison to audio received at the microphone 643 input. The delay processor 632 may be configured to provide the delay determined by the delay processor 632 to the variable delay function 633, which may be configured to insert the delay into the microphone 643 path of the user device 602 in order to cause arrival of the microphone 643 audio at approximately the same time as the packets in the television audio (RCV 1) 623 stream from the computing device 601 via the LAN interface 622.

The user device 602 may comprise two time sources: a real-time clock and a PCM sample clock. The real-time clock may be used, for example, as the basis for comparing the arrival time RF4CE packets received via the low latency connection 624 with the arrival time of data packets received via the LAN interface 622 (e.g., MoCA, WiFi, or Ethernet). The arrival time of a RF4CE packet (TR) via the low latency connection 624 and the arrival time of the corresponding packet (TU) in the television audio (RCV 1) 623 stream may be stored. Assuming an RF4CE end-to-end transmission delay of DR, the delay of the packet may be computed as DU=TU-TR-DR. The recent minimum value of DU may be tracked. Assuming that a jitter buffer (with a size/delay of JBS) is used to remove jitter from the packets in the television audio (RCV 1) 623 stream, the total delay of the receive signal as observed by the user device 602 may be computed to be min(TU)+JBS When the local speaker 638 of the user device 602 is used for audio playout, the playout control logic block 637 may be configured to determine the delay to insert. This delay may compensate for a possible buffering delay through an audio software driver on the way to local speaker 638. The delay processor 632 may also be configured to provide the delay determined by the playout control logic block 637 to the variable delay function 633, which may be configured to insert the delay into the microphone 643 path of the user device 602 in order to cause arrival of the microphone 643 audio at approximately the same time as audio being played out by local speaker 638.

The user device 602 may then use a filter 639 of the echo canceller 634 to remove the unwanted audio and/or interference in the delayed microphone audio. This unwanted audio may comprise the audio received acoustically 641 via the microphone 643 input from the user device 603 (e.g., a television) or from local speaker 638. Because the determined delay was inserted into the microphone 643 path of the user device 602 causing arrival of the microphone 643 audio at approximately the same time as the packets in the television audio (RCV 1) 623 stream from the computing device 601 via the LAN interface 622 or audio being played out by local speaker 638, the filter 639 can determine what the unwanted audio and/or interference is in the microphone 643 audio and then filter it out. For example, the unwanted audio data/interference received at the microphone 643 from user 603 may be determined by matching it with the synchronized television audio (RCV 1) 623 stream and then may be filtered out.

The system 600 may be configured to filter out audio in a prioritized order. For example, audio from playout audio (RCV 2) 625 or from other WiFi or Bluetooth sources 627 played out over local speaker 638 may be filtered out first, based on their proximity to microphone 643, before filtering out audio from television audio (RCV 1) 623. Alternatively, the system 600 may be configured to filter out audio from television audio (RCV 1) 623, playout audio (RCV 2) 625, and from other WiFi or Bluetooth sources 627 simultaneously.

The filtered signal may then be sent for NLP 635 and automatic gain control (AGC) 636. The processed microphone audio 626 may then be sent to the computing device 601 via the LAN interface 622 in order for the voice command to be processed. As a result, the voice command is not degraded based on the unwanted audio from the user device 603 or from local speaker 638 received acoustically at the microphone 643.

In one example, when the user device 602 receives a voice command via microphone 643, the user device 602 may collect audio samples and wait for timing information to arrive via the low latency connection 624. The user device 602 may be configured to track past RF4CE commands and determine which audio packets should correlate with the collected audio samples. For example, the user device 602 may be configured to wait for audio samples from the computing device 601 to be received via the LAN interface 622 and may then determine how the microphone 643 audio recording aligns with audio samples received from computing device 601. The audio samples received from computing device 601 that align with the microphone 643 audio recording may then be removed to enable the voice command to not be degraded and as a result be processed successfully.

Figure 7:
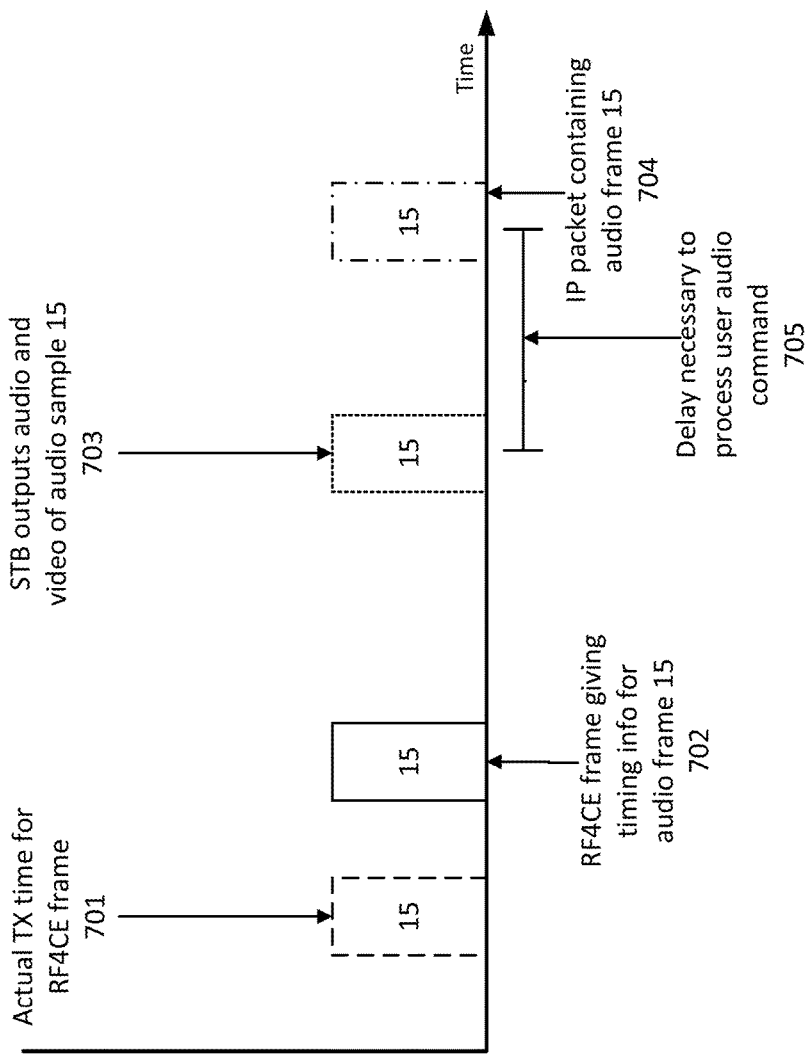
FIG. 7 shows an example timing diagram.

FIG. 7 is an example timing diagram 700. FIG. 7 illustrates when RF4CE timing information is sent and received, when a computing device such as a set-top box outputs audio, and when IP packets are received by a user device (e.g., an always-on listening assistant device or a remote control with a microphone capable of processing voice commands), at which point noise cancellation may be performed. Referring to FIG. 7, the actual transmit time for an RF4CE frame 701 (e.g., frame number 15) is shown. The RF4CE frame comprising timing information for audio frame (e.g., frame number 15) 702 is shown. The audio sample frame (e.g., frame number 15) in which the computing device (e.g., set-top box) outputs audio and video 703 is shown. The IP packet comprising the audio frame outputted by the computing device (e.g., set-top box) 704 is shown. The delay to be added to the microphone input path 705 is shown. This delay may be improved by delaying the output at the computing device (e.g., set-top box) (illustrated as the gap between 702 and 703). By increasing that gap, the delay 705 may be reduced. For example, this delay may be added to the startup/channel change time if the voice command is received by a remote control with a microphone capable of processing voice commands and/or generated by slowing playback (e.g., to 0.95×).

In another example, the user device (e.g., an always-on listening assistant device or a remote control with a microphone capable of processing voice commands) may be configured to acquire the same audiovisual content that the computing device (e.g., set-top box) receives and synchronize the audio packets in a similar fashion. As an example, the computing device (e.g., set-top box) and the user device (e.g., an always-on listening assistant device or a remote control with a microphone capable of processing voice commands) may each have real-time clocks which are both synchronized by the same Time of Day (ToD) server. The devices may use RF4CE communication to verify that the clocks are in sync. With the clocks in sync, the devices may exchange audio packets and append the time as known by each device. The devices may then compare the timestamp of the audio packet with the real-time clock time that was added to determine the latency between the audio streams received by each device. The device that first receives a packet (before the other device) may delay the audiovisual stream based on the delta between the times that the packets are received. As an example, if the computing device (e.g., set-top box) receives the audio stream at time T0 and the user device (e.g., an always-on listening assistant device or a remote control with a microphone capable of processing voice commands) receives the audio stream at T0+Xms, the computing device (e.g., set-top box) may delay the audio-visual content by Xms.

Figure 8:
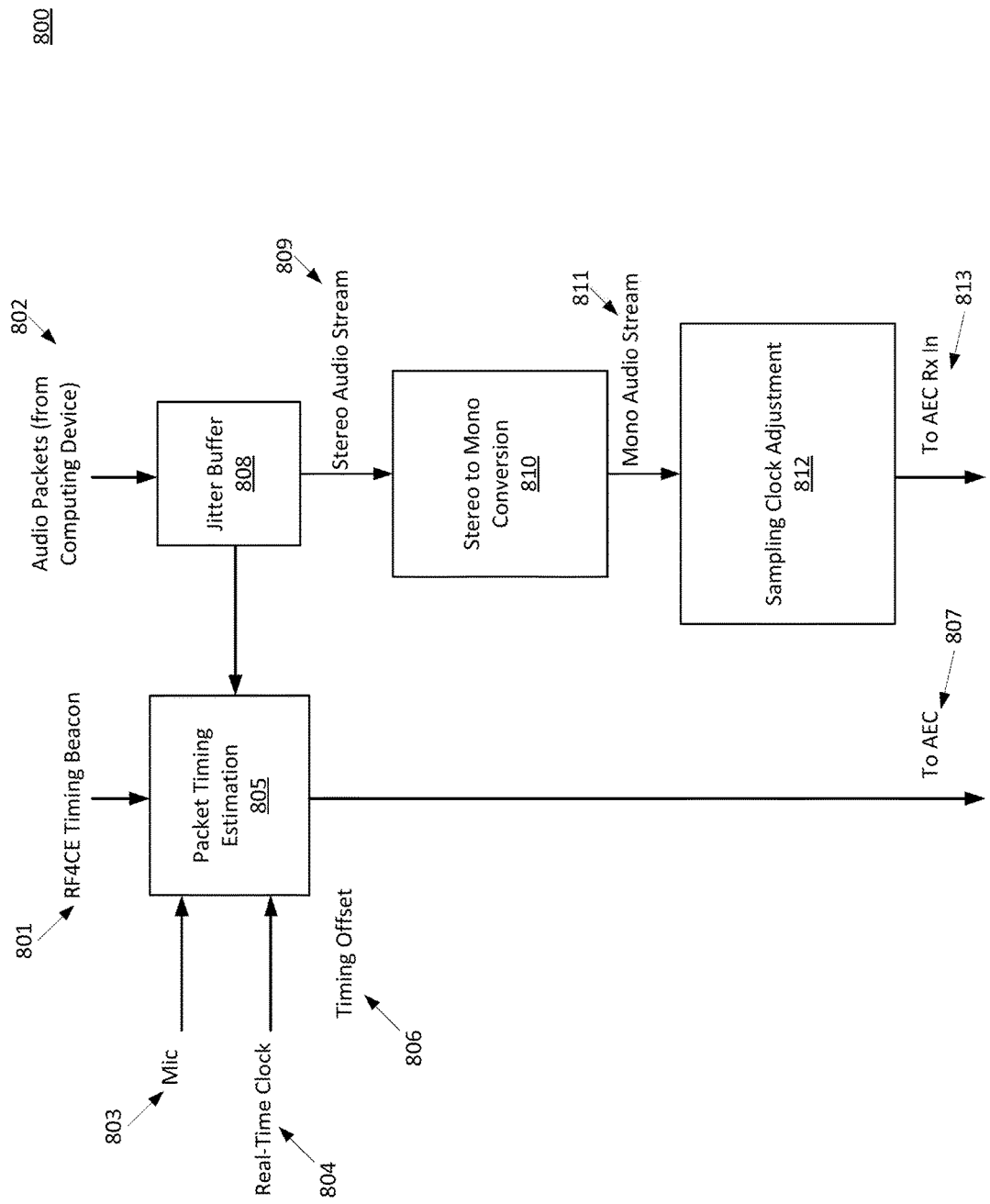
FIG. 8 shows an example data flow.

FIG. 8 shows an example data flow 800. The data flow 800 of FIG. 8, may be implemented in any of the devices described herein, such as by the user device 502 and/or the computing device 501 of the system 500 of FIG. 5 or the user device 602 and/or the computing device 601 of the system 600 of FIG. 6. Referring to FIG. 8, microphone 803 audio is sent to packet timing estimation 805. The packet timing estimation 805 may receive RF4CE timing beacon 801 and detect a timing offset 806 between the microphone 803 audio and a reference signal such as a real time clock 804, which may then be sent to an AEC 807. A jitter buffer 808 may receive audio packets (e.g., via UDP/WiFi) from a computing device, which may send them to the packet timing estimation 805. The jitter buffer 808 may send a stereo audio stream 809 to a stereo to mono conversion 810 and then send a mono audio stream 811 to sample clock adjustment 812 and to the AEC Rx In 813. If the AEC is stereo, the stereo audio stream 809 may be sent directly to sample clock adjustment 812 and to the AEC Rx In 813.

Figure 9:
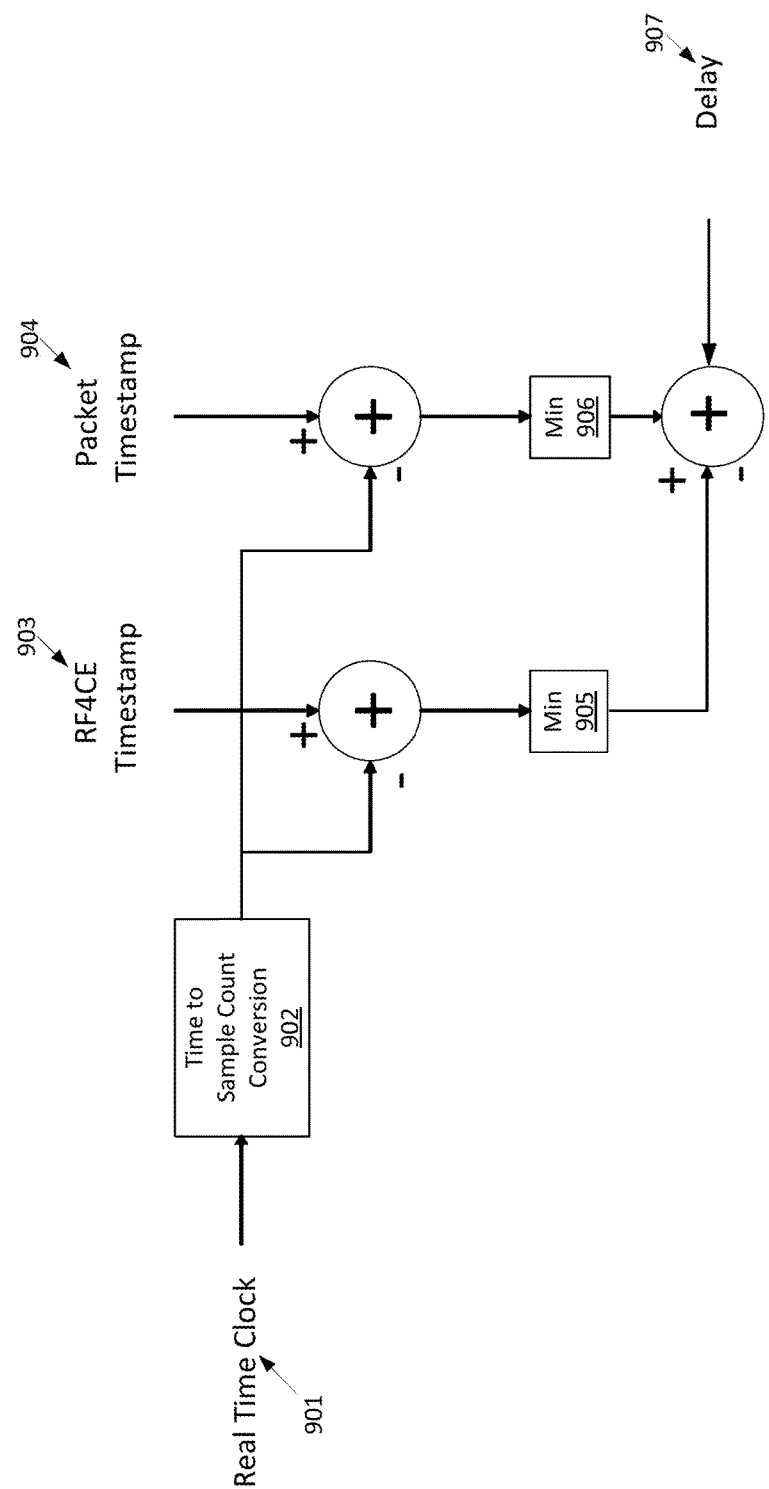
FIG. 9 shows an example timing estimation.

FIG. 9 shows an example timing estimation 900. The timing estimation 900 in the example of FIG. 9, may be implemented in any of the devices described herein, such as by the user device 502 and/or the computing device 501 of the system 500 of FIG. 5 or the user device 602 and/or the computing device 601 of the system 600 of FIG. 6. Referring to FIG. 9, a RF4CE timestamp 903 and a packet timestamp 904 are received. The real-time clock 901 may be received by the time to sample count conversion 902. The real-time clock 901 may be used, for example, as the basis for comparing the arrival time RF4CE timestamp 903 with the arrival time of the packet timestamp 904. The minimum value 905 of the arrival time RF4CE timestamp 903 and the minimum value 906 of the arrival of the packet timestamp 904 may be tracked. Using the techniques described above, the delay 907 may then be determined.

Figure 10:
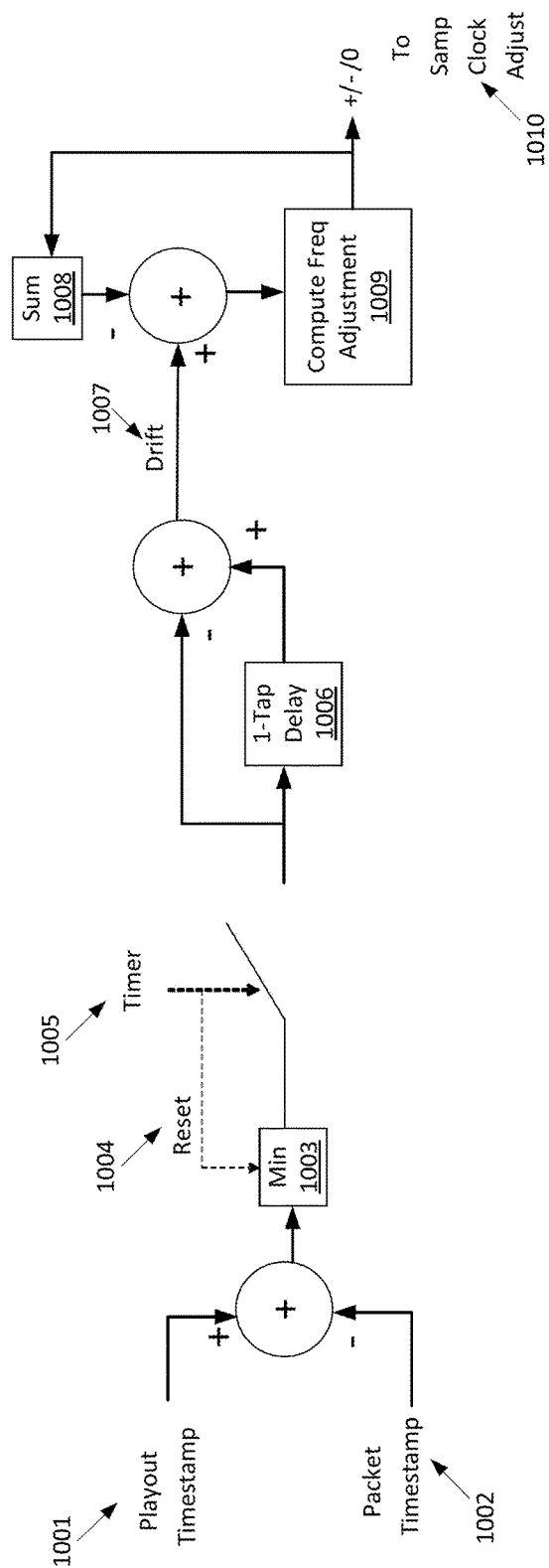
FIG. 10 shows an example clock adjustment control.

FIG. 10 shows an example clock adjustment control 1000. The clock adjustment control 1000 in the example of FIG. 10, may be implemented in any of the devices described herein, such as by the user device 502 and/or the computing device 501 of the system 500 of FIG. 5 or the user device 602 and/or the computing device 601 of the system 600 of FIG. 6. Referring to FIG. 10, a playout timestamp 1001 and a packet timestamp 1002 are received, and the minimum 1003 is tracked, which can be reset 1004 by the timer 1005. The frequency adjustment 1009 may be computed based on the delay 1006, drift 1007, and sum 1008. The frequency adjustment 1009 may be sent to the sample clock adjustment 1010.

Figure 11:
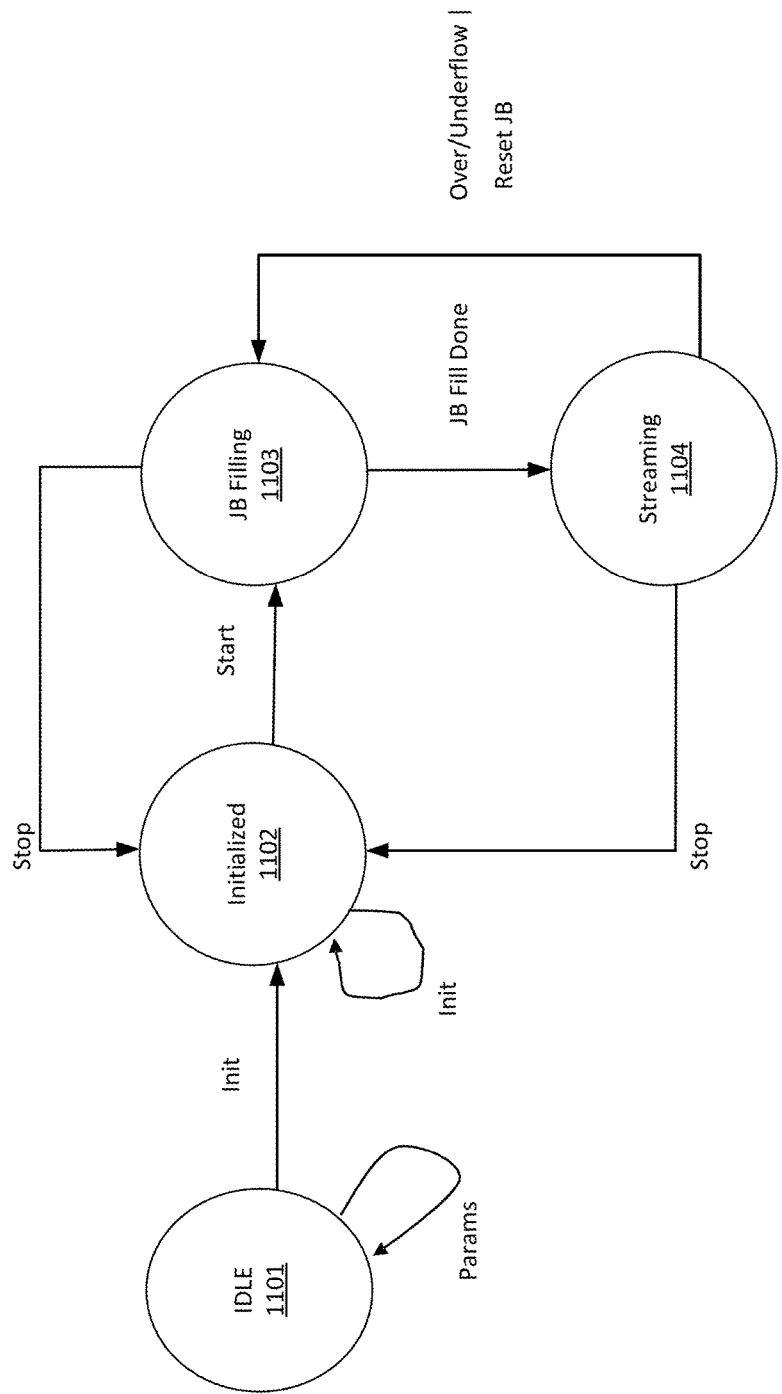
FIG. 11 shows an example state machine.

FIG. 11 shows an example state machine 1100. The state machine 1100 of FIG. 11, may be implemented in any of the devices described herein, such as by the user device 502 and/or the computing device 501 of the system 500 of FIG. 5 or the user device 602 and/or the computing device 601 of the system 600 of FIG. 6. Referring to FIG. 11, an idle state 1101 may be entered upon starting the device. During this state, the device may wait for the controller to send any necessary parameters prior to initialization. The initialized state 1102 may be entered after instantiation and initialization have been completed. During the initialized state, the device may wait for a start command. Active states may comprise the jitter buffer filling state 1103 and the streaming state 1104. The device may also receive RF4CE timing beacons during this time. While timing beacons and audio packets continue to arrive, the device may compute and refine its delay estimate. The delay estimate may subsequently be used by the device, such as for example by an AEC, to help align its reference signal with its microphone input signal. The device may receive microphone audio once per frame. The occurrence of a message may be used to control reads from a jitter buffer and writes to an audio device. If there is a timing difference between the received audio packets and microphone message timing, the difference may be reflected in the long-term jitter buffer statistics. These statistics may be used to control the sampling clock adjustment function. The jitter buffer filling state 1103 may initially be entered upon a start command. While in this state, the device may receive packets from another device such as a set-top box, filling the jitter buffer. Silence may be streamed to the AEC during this time because the jitter buffer is still filling up until it contains its nominal amount of data. The jitter buffer filling state can be re-entered during streaming if the jitter buffer either underflows or overflows.

The following table lists possible inbound messages and a list of states during which the message is allowed/expected. If a message arrives during a state that does not expect it, an error event may be generated.

| Message | Description | Allowable in State(s) |
|---|---|---|
| Initialize | Initialize using the most recently received parameter set | Idle, Init |
| Set/Update Parameters | Update parameters for use at next initialization time | All |
| Start | Start processing UDP and RF4CE packets | Initialized |
| Stop | Stop processing UDP and RF4CE packets | JB Filling, Streaming |
| Statistics Request | Send statistics message to requester | Initialized, JB Filling, Streaming |
| TV Volume Change Indication | Note the change in TV volume. For future use | Initialized, JB Filling, Streaming |
| Microphone Audio | Microphone audio is sent to IP manager on a frame-by-frame basis | JB Filling, Streaming. |
| Time Dither | When the AEC detects timing offset between the microphone and reference signal, this message is sent | JB Filling, Streaming |

Locally generated events may include but are not limited to the following: audio UDP packet received; RF4CE timing beacon received; jitter buffer overrun; jitter buffer underrun; and outbound messages/events.

The following table is a list of outbound messages, errors, and exceptions.

| Message | Description | Note |
|---|---|---|
| Jitter Buffer Overrun | The jitter buffer has overrun | Keep Stats |
| Jitter Buffer Underrun | The jitter buffer has underrun | Keep Stats |
| RF4CE Beacon Timeout | RF4CE timing beacon has gone missing | Keep Stats |
| Statistics Update | Timing and jitter statistics | Report upon demand |
| Allocation Error | Memory allocation error | Fatal. Report |
| Parameter Error | Error in parameter or parameter set | Report and prevent initialization |
| Message Error | Inbound message was received during a state that does not expect to see that message | Report and keep stats. |

| Message | Description | Note |
| --- | --- | --- |
| State Machine Error | An event has occurred that is illegal for the current state | Fatal - report |

The following statistics may be maintained by the device.

| Name | Description |
| --- | --- |
| JB Overrun Count | Jitter Buffer Overrun Count |
| JB Underrun Count | Jitter Buffer Underrun Count |
| RF4CE Beacon timeout count | RF4CE timeout count |
| Sampling Clock Offset | Estimated offset between TV D/A converter sampling clock and XR18 mic sampling clock |
| Minimum UDP/IP Delay | Minimum measured timing difference between UDP/IP packets and RF4CE beacons |
| Average UDP/IP Delay | Average measured timing difference between UDP/IP packets and RF4CE beacons |

Figure 12A:
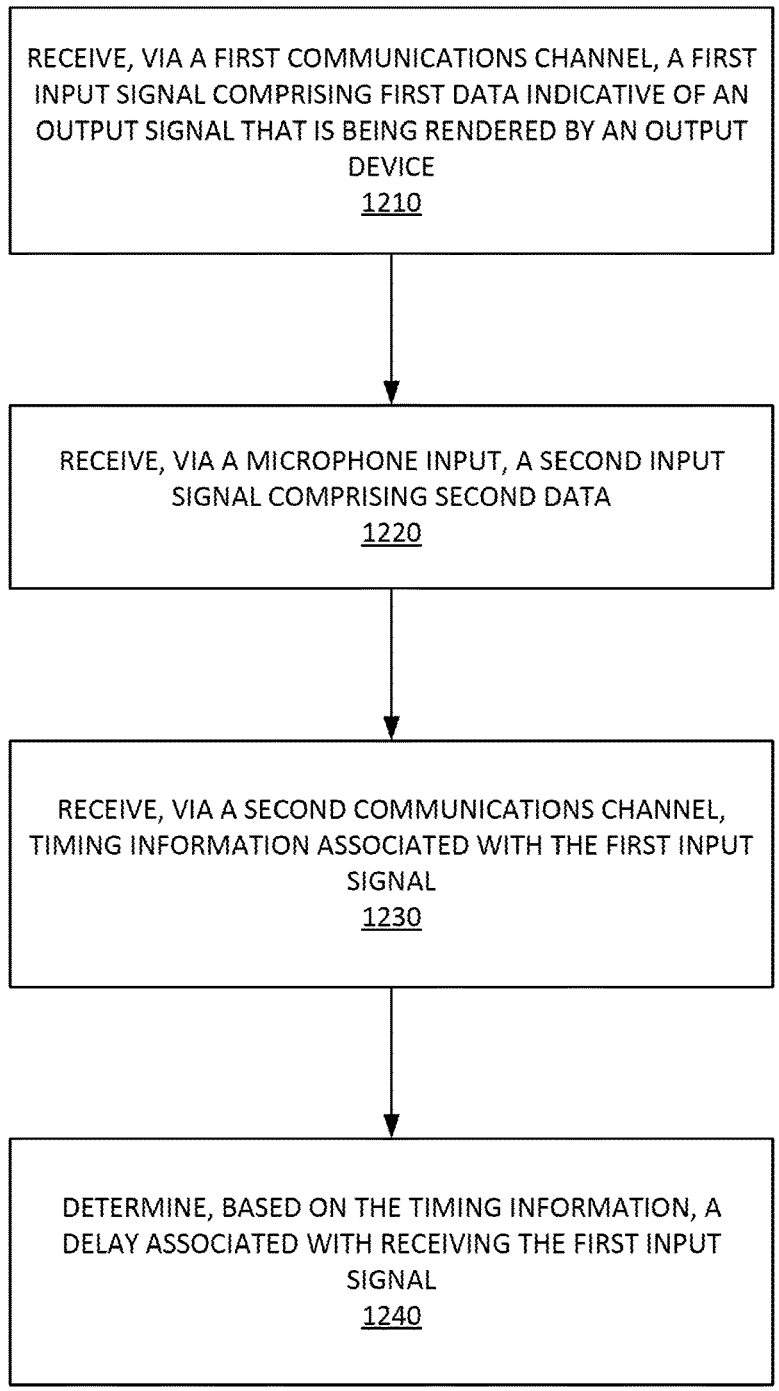
FIG. 12A shows an example method.
Figure 12B:
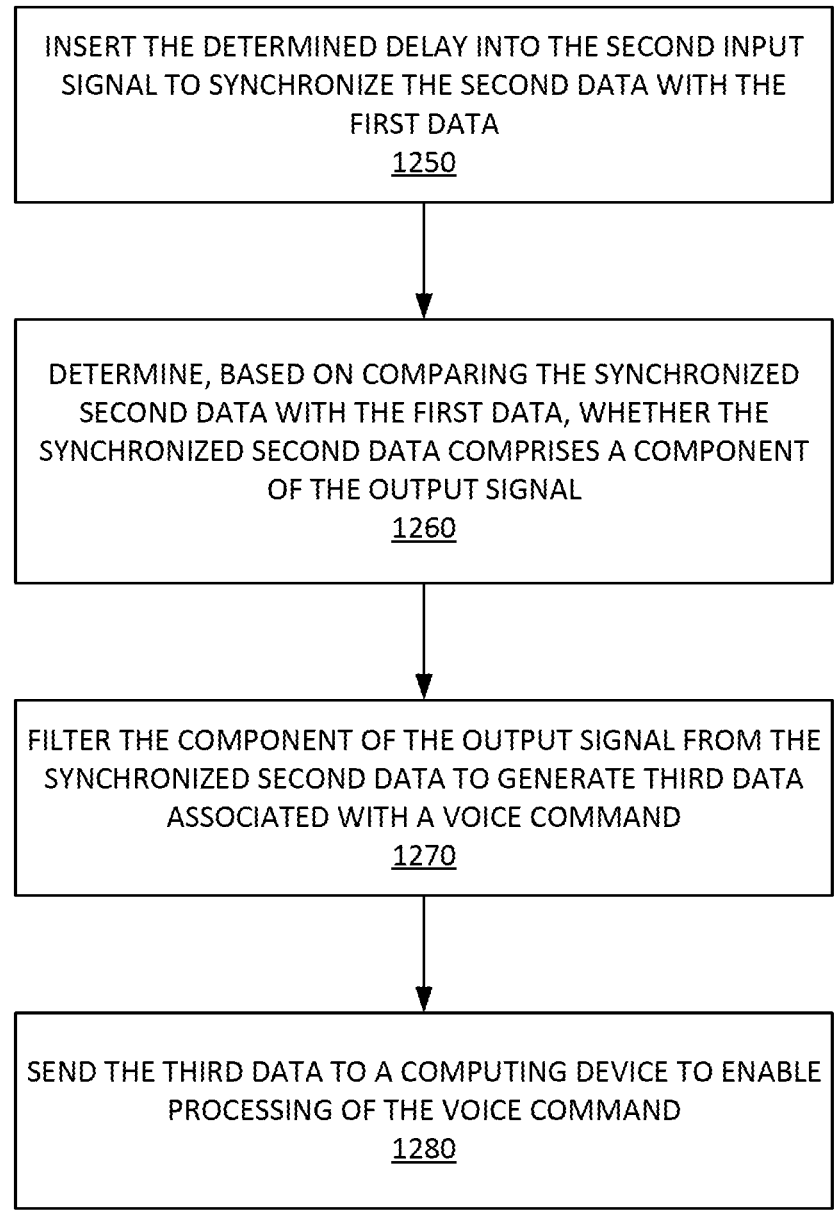
FIG. 12B shows an example method.

FIGS. 12A-12B show an example method 1200. The method 1200 of FIGS. 12A-12B, may be performed by any of the devices described herein, such as by the user device 502 and/or the computing device 501 of the system 500 of FIG. 5, or by the user device 602 and/or the computing device 601 of the system 600 of FIG. 6.

Referring to FIG. 12A, at step 1210, a first input signal comprising first data indicative of an output signal that is being rendered by an output device may be received via a first communications channel. The first communications channel may be a WiFi channel. The output signal may comprise audio that is being rendered by an output device, such as the speakers of a television. The first data may be a copy of the audio in the output signal. The first data may comprise timestamps that synchronized to the audio data in the output signal rendered by the output device At step 1220, a second input signal comprising second data may be received via a microphone input. The second data may comprise audio that was received by the microphone. The microphone may be part of an always listening device that is configured to always listen for voice commands via the microphone.

At step 1230, timing information associated with the first input signal may be received via a second communications channel. The second communications channel may comprise an RF4CE channel. The timing information may comprise a plurality of packets that each comprise a timestamp that may correspond with a timestamp in a packet in the first data.

At step 1240, a delay associated with receiving the first input signal may be determined based on the timing information. For example, the delay may be determined by comparing the arrival time of a packet in the received timing information to the arrival time in a corresponding packet in the first data. The corresponding packet in the first data may be determined by comparing (1) timestamps in the packets in the received timing information that are synchronized to packets in the first data with (2) timestamps in the received first data. The determined delay may comprise a difference between the arrival time of a packet in the received timing information and the arrival time in a corresponding packet in the first data.

Referring to FIG. 12B, at step 1250, the determined delay may be inserted into the second input signal to synchronize the second data with the first data. Inserting the determined delay into the second input signal may compensate for a slower connection speed associated with the first communications channel and enable the first input signal and second input signal to be received at a substantially same time.

At step 1260, it may be determined, based on comparing the synchronized second data with the first data, whether the synchronized second data comprises a component of the output signal. Interference caused by the output signal is indicated when the synchronized second data comprises a component of the output signal. The interference may have been received by the microphone input when the output signal was being rendered by an output device.

At step 1270, the component of the output signal may be filtered from the synchronized second data to generate third data associated with a voice command. The voice command may have been received at the microphone input and may have been included in the second data. By filtering the component of the output signal from the synchronized second data, the voice command can be processed without degradation or interference.

At step 1280, the third data may be sent to a computing device to enable processing of the voice command. The computing device may then process the voice command.

Figure 13:
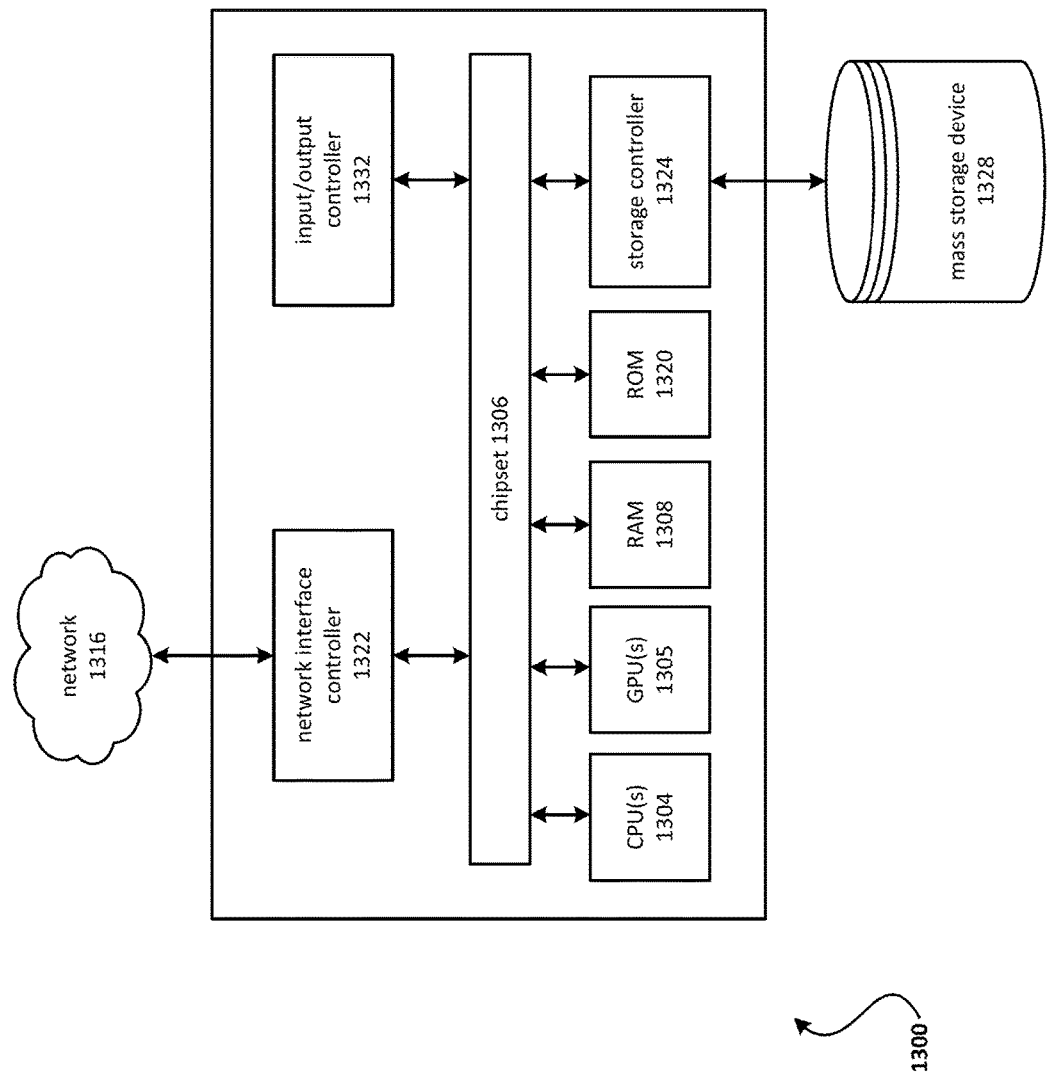
FIG. 13 shows an example computing device.

FIG. 13 depicts a computing device that may be used in various aspects, such as the servers, modules, and/or devices depicted in the systems described herein. With respect to the example system of FIG. 5, the user device 502 and/or the computing device 501 may each be implemented in an instance of a computing device 1300 of FIG. 13. With respect to the example system of FIG. 6, the user device 602 and/or the computing device 601 may each be implemented in an instance of a computing device 1300 of FIG. 13. The computer architecture shown in FIG. 13 shows a conventional server computer, workstation, desktop computer, laptop, tablet, network appliance, PDA, e-reader, digital cellular phone, or other computing node, and may be utilized to execute any aspects of the systems and methods described herein, such as to implement the methods described in relation to FIG. 12A and FIG. 12B.

The computing device 1300 may include a baseboard, or "motherboard," which is a printed circuit board to which a multitude of components or devices may be connected by way of a system bus or other electrical communication paths. One or more central processing units (CPUs) 1304 may operate in conjunction with a chipset 1306. The CPU(s) 1304 may be standard programmable processors that perform arithmetic and logical operations necessary for the operation of the computing device 1300.

The CPU(s) 1304 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1304 may be augmented with or replaced by other processing units, such as GPU(s) 1305. The GPU(s) 1305 may comprise processing units specialized for but not necessarily limited to highly parallel computations, such as graphics and other visualization-related processing.

A chipset 1306 may provide an interface between the CPU(s) 1304 and the remainder of the components and devices on the baseboard. The chipset 1306 may provide an interface to a random access memory (RAM) 1308 used as the main memory in the computing device 1300. The chipset 1306 may further provide an interface to a computer-readable storage medium, such as a read-only memory (ROM) 1320 or non-volatile RAM (NVRAM) (not shown), for storing basic routines that may help to start up the computing device 1300 and to transfer information between the various components and devices. ROM 1320 or NVRAM may also store other software components necessary for the operation of the computing device 1300 in accordance with the aspects described herein.

The computing device 1300 may operate in a networked environment using logical connections to remote computing nodes and computer systems through local area network (LAN) 1316. The chipset 1306 may include functionality for providing network connectivity through a network interface controller (NIC) 1322, such as a gigabit Ethernet adapter. A NIC 1322 may be capable of connecting the computing device 1300 to other computing nodes over a network 1316. It should be appreciated that multiple NICs 1322 may be present in the computing device 1300, connecting the computing device to other types of networks and remote computer systems.

The computing device 1300 may be connected to a mass storage device 1328 that provides non-volatile storage for the computer. The mass storage device 1328 may store system programs, application programs, other program modules, and data, which have been described in greater detail herein. The mass storage device 1328 may be connected to the computing device 1300 through a storage controller 1324 connected to the chipset 1306. The mass storage device 1328 may consist of one or more physical storage units. A storage controller 1324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1300 may store data on a mass storage device 1328 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1328 is characterized as primary or secondary storage and the like.

For example, the computing device 1300 may store information to the mass storage device 1328 by issuing instructions through a storage controller 1324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1300 may further read information from the mass storage device 1328 by detecting the physical states or characteristics of one or more particular locations within the physical storage units.

In addition to the mass storage device 1328 described herein, the computing device 1300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1328 depicted in FIG. 13, may store an operating system utilized to control the operation of the computing device 1300. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1328 may store other system or application programs and data utilized by the computing device 1300.

The mass storage device 1328 or other computer-readable storage media may also be encoded with computer-executable instructions, which, when loaded into the computing device 1300, transforms the computing device from a general-purpose computing system into a special-purpose computer capable of implementing the aspects described herein. These computer-executable instructions transform the computing device 1300 by specifying how the CPU(s) 1304 transition between states, as described herein. The computing device 1300 may have access to computer-readable storage media storing computer-executable instructions, which, when executed by the computing device 1300, may perform any of the methods described herein such as the methods in relation to FIG. 12A and FIG. 12B.

A computing device, such as the computing device 1300 depicted in FIG. 13, may also include an input/output controller 1332 for receiving and processing input from a number of input devices, such as a keyboard, a mouse, a touchpad, a touch screen, an electronic stylus, or other type of input device. Similarly, an input/output controller 1332 may provide output to a display, such as a computer monitor, a flat-panel display, a digital projector, a printer, a plotter, or other type of output device. It will be appreciated that the computing device 1300 may not include all of the components shown in FIG. 13, may include other components that are not explicitly shown in FIG. 13, or may utilize an architecture completely different than that shown in FIG. 13.

As described herein, a computing device may be a physical computing device, such as the computing device 1300 of FIG. 13. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A system comprising:
   one or more processors; and
   memory storing instructions that, when executed by the one or more processors, cause the system to:
   receive, via a first communications channel, a first input signal comprising first data indicative of an output signal that is being rendered by an output device;
   receive, via a microphone input, a second input signal comprising second data;
   receive, via a second communications channel, timing information associated with the first input signal;
   determine, based on the timing information, a delay associated with receiving the first input signal;
   insert the determined delay into the second input signal to synchronize the second data with the first data;
   determine, based on comparing the synchronized second data with the first data, whether the synchronized second data comprises a component of the output signal;
   filter the component of the output signal from the synchronized second data to generate third data associated with a voice command; and
   send the third data to a computing device to enable processing of the voice command.

2. The system of claim 1, wherein the first data comprises a plurality of packets and each packet of the plurality of packets comprises a first timestamp, wherein the timing information comprises a plurality of second timestamps and each second timestamp of the plurality of second timestamps corresponds with a first timestamp.

3. The system of claim 2, wherein determining the delay further comprises:
   determine a first arrival time of a packet of the plurality of packets; and
   determine a second arrival time of a second timestamp of the plurality of second timestamps that corresponds with a first timestamp in the packet.

4. The system of claim 3, wherein the delay comprises a difference between the first arrival time and the second arrival time.

5. The system of claim 1, further comprising:
   a delay processor configured to determine the delay.

6. The system of claim 1, wherein the timing information comprises a plurality of timestamps and each timestamp of the plurality of timestamps corresponds with a packet in the first data.

7. The system of claim 6, wherein determining the delay further comprises:
   comparing a first arrival time of a timestamp in the timing information with a second arrival time of a corresponding packet in the first data.

8. The system of claim 1, wherein the timing information comprises at least one Radio Frequency for Consumer Electronics (RF4CE) beacon.

9. The system of claim 1, wherein the second communications channel comprises a Radio Frequency for Consumer Electronics (RF4CE) channel.

10. The system of claim 9, wherein clear channel assessment (CCA) is disabled when receiving the timing information.

11. The system of claim 9, wherein retransmissions are disabled and are not acknowledged when receiving the timing information.

12. The system of claim 1, wherein the first communications channel comprises a local area network (LAN) interface.

13. The system of claim 1, wherein the instructions, when executed by the one or more processors, further cause the system to:
   store the second data at least until the timing information is received.

14. The system of claim 1, wherein the instructions, when executed by the one or more processors, further cause the system to:
   track previous timing information received on the second communications channel.

15. A method comprising:
   receiving, via a first communications channel, a first input signal comprising first data indicative of an output signal that is being rendered by an output device;
   receiving, via a microphone input, a second input signal comprising second data;
   receiving, via a second communications channel, timing information associated with the first input signal;
   determining, based on the timing information, a delay associated with receiving the first input signal;
   inserting the determined delay into the second input signal to synchronize the second data with the first data;
   determining, based on comparing the synchronized second data with the first data, whether the synchronized second data comprises a component of the output signal;

filtering the component of the output signal from the synchronized second data to generate third data associated with a voice command; and sending the third data to a computing device to enable processing of the voice command.

16. The method of claim 15, wherein the first data comprises a plurality of packets and each packet of the plurality of packets comprises a first timestamp, wherein the timing information comprises a plurality of second timestamps and each second timestamp of the plurality of second timestamps corresponds with a first timestamp.

17. The method of claim 16, wherein determining the delay further comprises:
determining a first arrival time of a packet of the plurality of packets; and
determining a second arrival time of a second timestamp of the plurality of second timestamps that corresponds with a first timestamp in the packet.

18. The method of claim 17, wherein the delay comprises a difference between the first arrival time and the second arrival time.

19. The method of claim 15, wherein the second communications channel comprises a Radio Frequency for Consumer Electronics (RF4CE) channel.

20. A method comprising:
receiving, via a first communications channel, a first input signal comprising first data indicative of an output signal that is being rendered by an output device;
receiving, via a microphone input, a second input signal comprising second data comprising audio data associated with a voice command;
determining, based on timing information that is associated with the first input signal and that is received via a second communications channel, a delay associated with receiving the first input signal;
inserting the determined delay into the second input signal to synchronize the second data with the first data;
determining, based on comparing the synchronized second data with the first data, whether the synchronized second data comprises interference from the output signal;
filtering the interference from the synchronized second data to generate third data associated with the voice command; and
sending the third data to a computing device to enable processing of the voice command.

* * * * *